United States Patent [19]
Komatsubara et al.

[11] Patent Number: 4,598,169
[45] Date of Patent: Jul. 1, 1986

[54] SYSTEM FOR DETECTING A MARKER SIGNAL INSERTED IN AN INFORMATION SIGNAL

[75] Inventors: Michimasa Komatsubara, Chiba; Takeshi Fukami; Akira Sakamoto, both of Tokyo; Takehiro Sugita, Chigasaki; Toshiya Miyata, Tokyo, all of Japan

[73] Assignee: Sony Corporation, Tokyo, Japan

[21] Appl. No.: 563,979

[22] Filed: Dec. 21, 1983

[30] Foreign Application Priority Data

Dec. 24, 1982 [JP] Japan ............................ 57-232258

[51] Int. Cl.⁴ .................................................. H04L 9/00
[52] U.S. Cl. .................................... 178/22.04; 178/22.17
[58] Field of Search ................ 178/22.07, 22.17, 22.04; 179/1.5 S; 375/2.1, 2.2, 108, 116, 112, 119

[56] References Cited

U.S. PATENT DOCUMENTS

| | | | |
|---|---|---|---|
| 3,978,285 | 8/1976 | Tan et al. .............................. | 375/119 |
| 4,091,423 | 5/1978 | Branscome .......................... | 375/116 |
| 4,275,466 | 6/1981 | Yamamoto .......................... | 375/108 |
| 4,305,152 | 12/1981 | Asakawa et al. ................... | 375/112 |
| 4,322,576 | 3/1982 | Miller ................................. | 178/22.07 |
| 4,344,180 | 8/1982 | Cummiskey ........................ | 375/116 |
| 4,347,606 | 8/1982 | Hoogeveen ......................... | 375/116 |
| 4,397,020 | 8/1983 | Howson .............................. | 375/116 |
| 4,434,323 | 2/1984 | Levine et al. ..................... | 178/22.16 |
| 4,453,260 | 6/1984 | Inagawa et al. ................... | 375/116 |
| 4,466,017 | 8/1984 | Banker ............................... | 358/121 |

Primary Examiner—Salvatore Cangialosi
Assistant Examiner—Aaron J. Lewis
Attorney, Agent, or Firm—Lewis H. Eslinger; Alvin Sinderbrand

[57] ABSTRACT

A system for detecting a marker signal with a predetermined pattern inserted periodically in an information signal comprises a circuit which repetitively generates window signals and successively shifts the window signals in a step-wise fashion during a predetermined interval, a detecting circuit which employs the window signals to detect at least a portion of a marker signal in the information signal when at least the portion of the detected marker signal occurs during one of the window signals, a circuit which determines when the detected marker signal has the predetermined pattern to generate a net marker signal in response thereto, and a circuit responsive to the net marker signal which repetitively generates subsequent unshifted window signals beginning a predetermined time after the detected marker signal.

13 Claims, 34 Drawing Figures

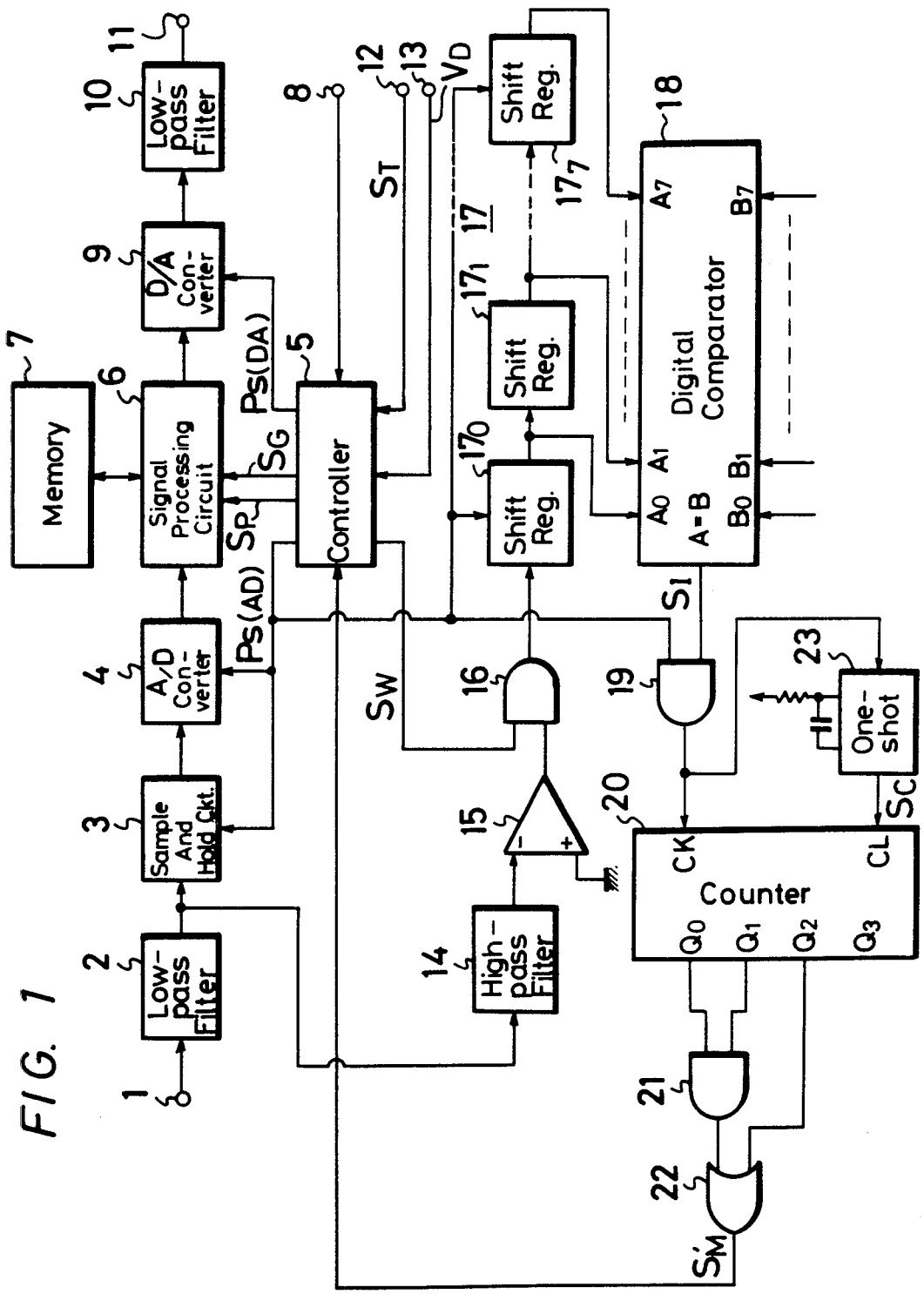

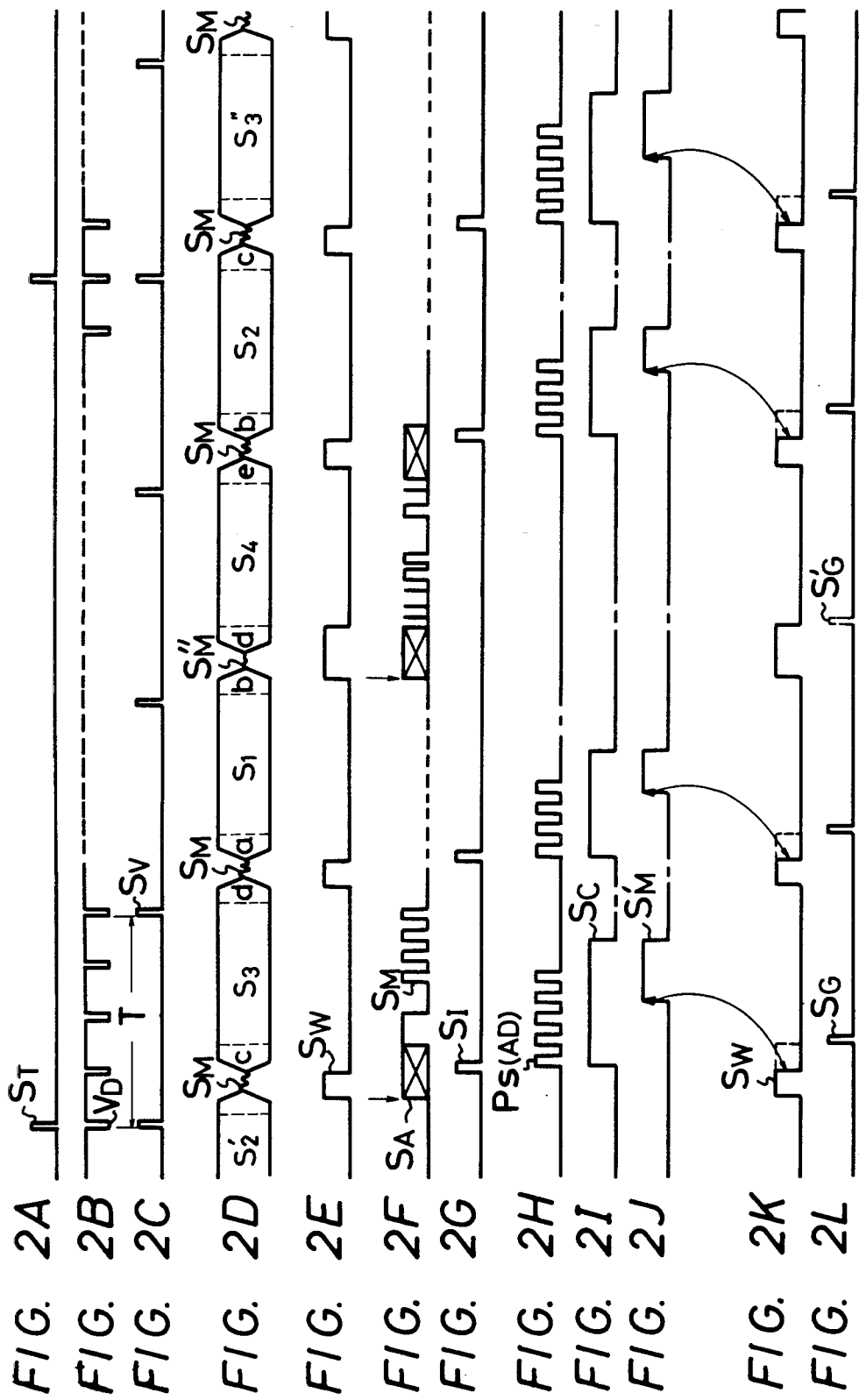

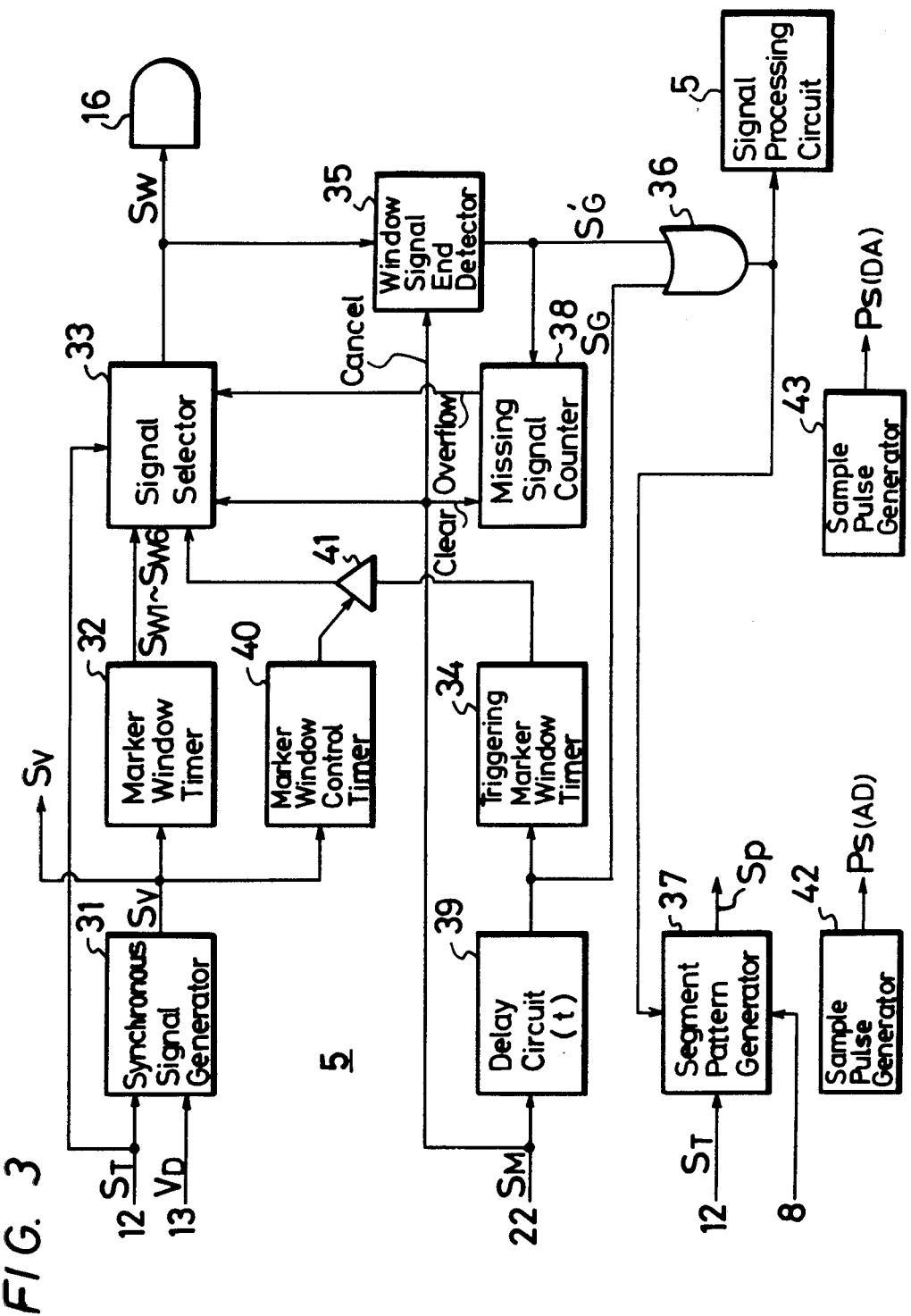

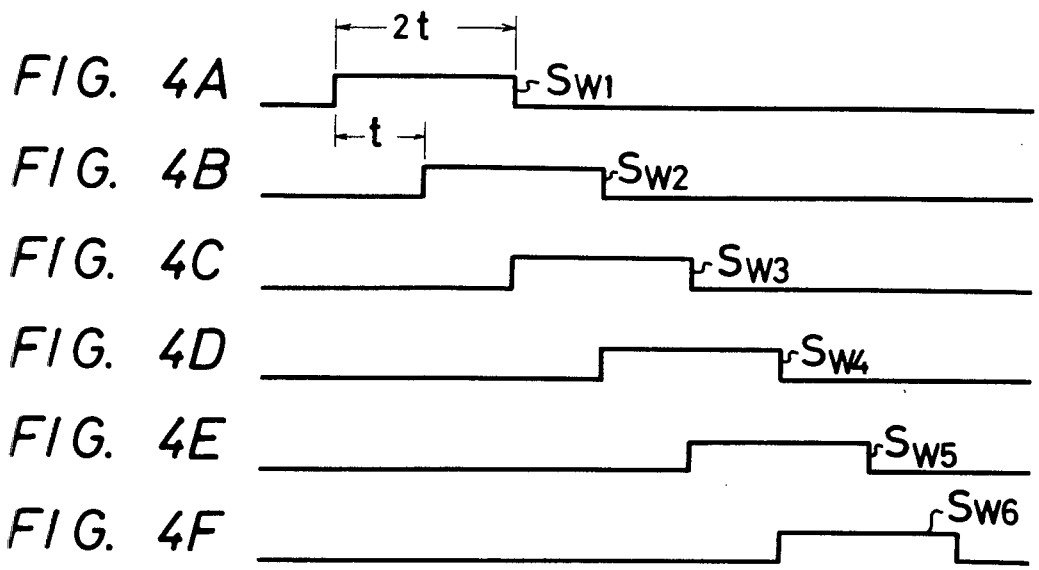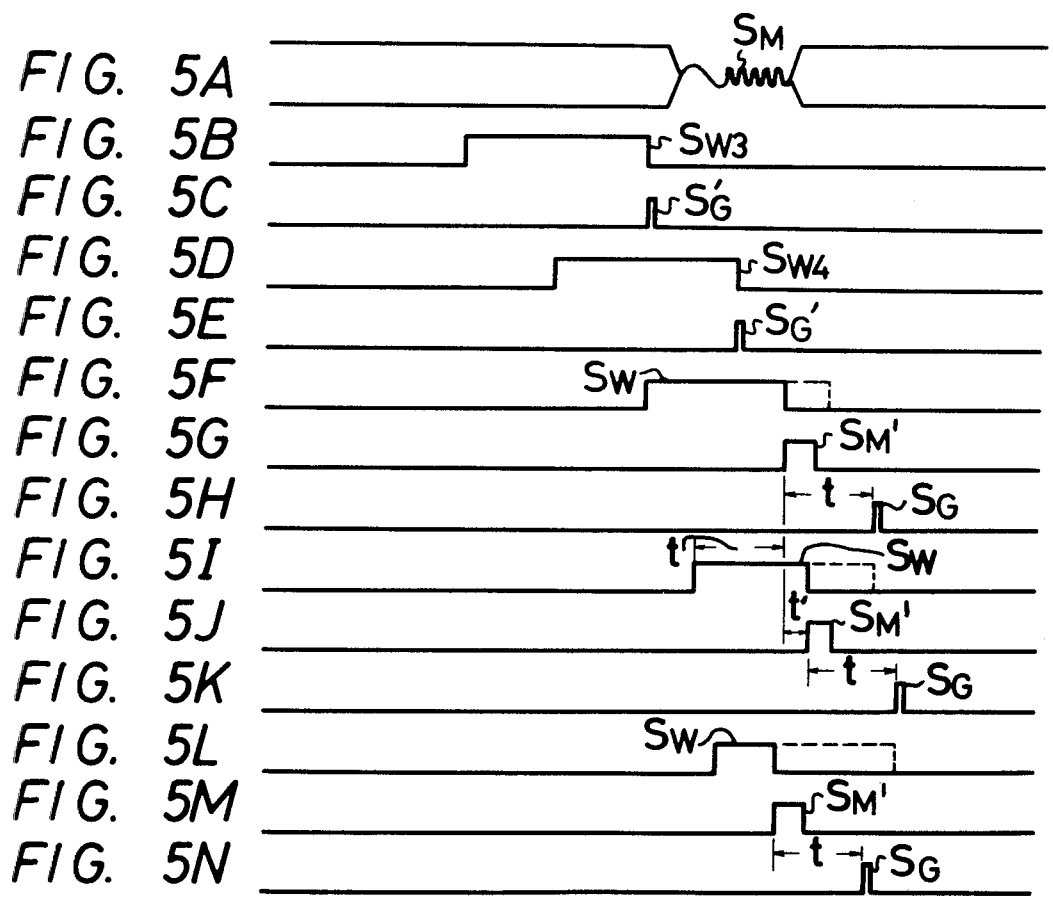

SYSTEM FOR DETECTING A MARKER SIGNAL INSERTED IN AN INFORMATION SIGNAL

BACKGROUND OF THE INVENTION

1. Field of the Invention

This invention relates to a marker signal detecting system, and more particularly, to a system which detects a marker signal periodically inserted in an information signal such as a scrambled audio signal or the like.

2. Description of the Prior Art

In a scrambling system for an audio signal, an information signal is divided into a plurality of blocks, with each block then being formed of a plurality of segments. The segments of the audio signal are re-arranged on a timebase in a predetermined order to form the scrambled audio signal. On reception, the segments are rearranged into the original order to reproduce or restore the original audio signal.

If the scrambled audio signal is subject to timebase fluctuations which can occur, for example, if the signal is first recorded by a video tape recorder and then played back, the original audio signal reproduced from the video tape recorder can be distorted. Alternatively, noise can be superimposed on the signal, since a connecting portion between respective segments is displaced due to the timebase fluctuations, thus causing significant deterioration in the quality of the audio signal.

In a proposed system, a marker signal has been superimposed upon the audio signal to indicate or mark the beginning of each segment in a block of the audio signal in order to deal with the errors which occur from timebase fluctuations. A notch filter or the like is used to extract the marker signal from the information signal. A phase-locked loop (PLL) circuit can be used to lock in on the extracted marker signal which repeats at periodic intervals. However, in such a system, the reproduced signal is theoretically worse than the original signal because the marker signal is inserted within a band or region of the audio signal so that a portion of the audio signal is obliterated. An additional drawback to this system is its expense in that the notch filter used to extract the marker signal is expensive.

In order to deal with such problems, it has also been proposed to utilize as the marker signal a high or low frequency signal which is outside the band or region of the audio signal. When a high frequency signal is used as the marker signal, however, the signal transmission path is restricted. When a low frequency signal is utilized as the marker signal, a long time is needed to detect the signal. In addition, a low frequency signal is difficult to detect.

OBJECTS AND SUMMARY OF THE INVENTION

Accordingly, it is an object of the present invention to provide an improved marker signal detecting system for use with a scrambled audio signal.

It is another object of the present invention to provide a marker signal detecting system for use with a scrambled audio signal which can detect with very high accuracy a marker signal periodically inserted into the scrambled signal.

It is yet another object of the present invention to provide a low cost marker signal detecting system for use with a scrambled audio signal.

It is still a further object of the present invention to provide a marker signal detecting system which can quickly detect a marker signal inserted in a scrambled audio signal.

In accord with the present invention, a system for detecting a marker signal with a predetermined pattern inserted periodically in an information signal includes means for repetitively generating window signals and successively shifting the window signals in a step-wise fashion during a predetermined interval, means employing the window signals for detecting at least a portion of a marker signal in the information signal when at least the portion of the detected marker signal occurs during one of the window signals, means for determining when the detected marker signal has the predetermined pattern and generating a net marker signal in response thereto, and means responsive to the net marker signal for repetitively generating subsequent unshifted window signals beginning a predetermined time after the detected marker signal.

The above, and other objects, features, and advantages of the present invention will become apparent from the following detailed description of an illustrative embodiment thereof taken in conjunction with the accompanying drawings.

BRIEF DESCRIPTION OF THE DRAWINGS

FIG. 1 is a block diagram illustrating an embodiment of a marker signal detecting system in accord with the present invention;

FIGS. 2A to 2L are waveform diagrams useful in explaining the operation of the marker signal detecting system of FIG. 1;

FIG. 3 is a block diagram of a controller circuit included in the embodiment of the invention shown on FIG. 1; and FIGS. 4A to 4F and 5A to 5N are waveform diagrams useful in explaining the operation of the circuit of FIG. 3.

DESCRIPTION OF THE PREFERRED EMBODIMENT

Referring to the drawings, and initially to FIG. 1 thereof, an embodiment of the present invention will be described in conjunction with an information signal such as a scrambled audio signal in which the transmission bandwidth is restricted, and the information signal with a marker signal included therein may have timebase fluctuations. Such timebase fluctuations can occur, for example, when the information signal is recorded with a video tape recorder and then played back. For the illustrated embodiment, the audio signal is divided into a plurality of blocks. Each block is formed of a plurality of segments, with the segments thereof arranged on a timebase in a predetermined order for each block. In the scrambling operation, the segments of each block are changed in order. In addition, the respective segments are compressed in timebase, and a redundant portion formed from interpolating data comprising the audio signal is inserted between the segments. The marker signal which is to be detected is then inserted in the redundant portion between two segments.

The scrambled audio signal (see FIG. 2D) from an input terminal 1 is supplied through a low-pass filter 2 to a sample and hold circuit 3 where it is sampled, held, and then supplied to an analog to digital converter 4 which converts an analog signal to a digital signal. A controller 5 supplies control signals $P_S(AD)$ to control sample and hold circuit 3 and analog to digital converter 4, as described more fully hereinbelow.

The digital signal from analog to digital converter 4 is supplied to a signal processing circuit 6 and thence, to a random access memory (RAM) 7 into which the digital signal is written and from which the digital signal may be read. Controller 5 supplies at each segment a segment pattern information signal $S_P$ to signal processing circuit 6 regarding the information required to rearrange the order of the scrambled audio signal. As described more fully hereinbelow with reference to FIG. 3, a key code from a terminal 8 is supplied to a segment pattern generator circuit 37 included in controller 5 and which generates the segment pattern information signal $S_P$. Signal processing circuit 6, in response to the segment pattern information signal $S_P$, rearranges the data read out from RAM 7 so that it corresponds to the normal or unscrambled audio signal.

Signal processing circuit 6 also performs a time-base expansion of the scrambled audio signal by changing the reading and writing rate of RAM 7. Accordingly, the frequency $f_{AD}$ of sampling pulse $P_{S(AD)}$ for analog to digital converter 4 and the frequency $f_{DA}$ of a sampling pulse $P_{S(DA)}$ for a digital to analog converter 9 have the following relationship:

$f_{AD}$ is greater than $f_{DA}$.

Controller circuit 5 supplies sampling pulses $P_{S(DA)}$ to control digital to analog converter 9 whereby the digital data read from RAM 7 is converted to analog data. The analog data is then supplied to a low pass filter 10 and thence, to an output terminal 11 as a descrambled audio signal.

The detection of a marker signal inserted into the redundant portion of a scrambled audio signal is next to be described.

A start signal $S_T$ which indicates the beginning of each block of the audio signal (as illustrated in FIG. 2A) is supplied to controller 5 from a terminal 12. A vertical synchronizing signal $V_D$ of a video signal (as illustrated in FIG. 2B) is supplied to controller 5 from a terminal 13. It is to be appreciated that, according to the preferred embodiment, the scrambled audio signal with which the present invention is concerned accompanies a scrambled video signal, and that the two signals together comprise a scrambled television signal. Controller 5 generates a synchronous signal $S_V$ (see FIG. 2C) in response to start signal $S_T$ and vertical synchronizing signal $V_D$ and has a period T equal to 4V (where the interval of one segment of the audio signal is selected to be four times the vertical sweep interval V of an associated video signal). Controller 5 generates a window signal $S_W$, which functions as a marker signal detecting signal, a predetermined time after the generation of synchronous signal $S_V$.

In the scrambled audio signal of FIG. 2D supplied from input terminal 1, the reference letters $S_3$, $S_1$, $S_4$ and $S_2$ identify the order in which the segments of the original audio signal have been rearranged in one block upon encoding. According to the encoding scheme of FIG. 2D, each block of the original audio signal is divided into four segments. The third segment is transmitted first, the first segment is transmitted second, the fourth segment is transmitted third, and the second segment is transmitted last. In FIG. 2D, segments $S_2'$ and $S_3''$ represent the second and third segments, respectively, of the preceding and following blocks.

Each segment $S_i$ (i equals 1 to 4) includes redundant portions inserted at the beginning and at the end which are formed by interpolating data of the audio signal, as indicated by the broken lines. In FIG. 2D, the redundant portions are indicated by the reference letters a, b, c, d and e. The redundant portions designated by the same reference letter, for example, d, indicate data having the same content. Each marker signal $S_M$ is inserted substantially between the redundant portions of segments $S_i$.

Low pass filter 2 removes the low frequency band components of the scrambled audio signal from input terminal 1, and the resulting signal is supplied to a high-pass filter 14. The output signal from high-pass filter 14 is supplied to an inverting input terminal of a comparator 15. A non-inverting input terminal of comparator 15 is connected to ground. Accordingly, a zero-cross point of the input signal supplied to comparator 15 is detected and the signal is waveform shaped so that comparator 15 generates digital data at its output terminal.

The output digital data from comparator 15 is supplied to one input terminal of a gate circuit such as AND circuit 16. Window signal $S_W$ (see FIG. 2E) from controller 5 is supplied to another input terminal of AND circuit 16. During window signal $S_W$, AND circuit 16 supplies a signal which, as shown on an enlarged scale in FIG. 2F, includes an audio signal $S_A$ and a marker signal $S_M$.

The output signal from AND circuit 16 is sequentially supplied in response to sampling pulse $P_{S(AD)}$ from controller 5 to a register circuit 17 comprising, in the illustrated embodiment, a plurality of shift registers $17_0$ to $17_7$. In one example, each shift register $17_i$ (i equals 0 to 7) is formed of a plurality of stages, for example, five. The output signals from the last stage of each shift register $17_i$ (i equals 0 to 7) are supplied to a respective input terminal $A_0$ to $A_7$ of a digital comparator 18. A pattern information signal corresponding to the pattern of the marker signal inserted in the scrambled audio signal is supplied to input terminals $B_0$ to $B_7$ of digital comparator 18. Digital comparator 18 generates a coincidence or identification output signal $S_I$ (as shown in FIG. 2G) when the pattern setting values supplied to input terminals $B_0$ to $B_7$ coincide with the contents of shift registers $17_0$ to $17_7$ supplied to input terminals $A_0$ to $A_7$.

Coincidence output signal $S_I$ opens the gate of an AND circuit 19 so that, during the period of coincidence output signal $S_I$, sampling pulse $P_{S(AD)}$ from controller 5 (as shown on an enlarged scale in FIG. 2H) is supplied to a clock terminal CK of a counter 20 for counting by the latter. Counter 20 generates a count value as a net marker signal when the count value thereof reaches a predetermined value, for example, three or more. In the illustrated embodiment, counter 20 can count up to seven for its output count value. Gate means, such as an AND circuit 21 and an OR circuit 22, are connected to output terminals of counter 20. AND circuit 21 has two input terminals thereof connected to output terminals $Q_0$ and $Q_1$ of counter 20, while one input terminal of OR circuit 22 is connected to the output terminal of AND circuit 21 and another input terminal of OR circuit 22 is connected to output terminal $Q_2$ of counter 20. Consequently, when the count value of counter 20 reaches "3", that is, the logic levels at the output terminals $Q_0$, $Q_1$ and $Q_2$ are [110], respectively, the gates of AND circuit 21 and OR circuit 22 open so that OR circuit 22 generates a net marker signal $S_M'$ (see FIG. 2J) which is supplied to controller 5. When the count value of counter 20 ranges between four, corresponding to logic levels at output terminals $Q_0$, $Q_1$ and $Q_2$ of [001], and seven, corresponding to logic levels at output terminals $Q_0$, $Q_1$ and $Q_2$ of [111], gate means 21, 22 generate net marker signal $S_M'$ in a similar fashion. A monostable multivibrator or one-shot 23 triggered by the output of AND gate 19 generates an output signal $S_C$ which is applied to counter 20 and determines the length or end of net marker signal $S_M'$. As illustrated on an enlarged scale in FIG. 2I, output signal $S_C$ rises in synchronism with the first input pulse to counter 20 and falls after a predetermined time.

Controller 5 closes window signal $S_W$ in response to net marker signal $S_M'$. As shown on FIGS. 2J and 2K, in the illustrated embodiment, controller 5 closes window signal $S_W$ in synchronism with the leading edge of net marker signal $S_M'$. Controller 5 generates a segment switching signal $S_G$ (FIG. 2L) a predetermined time thereafter, and such signal $S_G$ is supplied to signal processing circuit 6. Signal processing circuit 6 carries out signal processing operations upon the scrambled audio signal, such as rearrangement of the signal into its original order and the like, by switching or rearranging each segment of the audio signal on the basis of segment switching signal $S_G$.

In transmitting the scrambled audio signal, a portion of marker signal $S_M$ can drop out, for example, as indicated near the center of FIG. 2D by the reference $S_M''$. Marker signal $S_M$ can be absent, for example, due to a dropout or the like in the transmission path. When a portion of marker signal $S_M$ drops out, AND circuit 16 does not generate a signal which contains the normal marker signal pattern, as illustrated in FIG. 2F. Accordingly, digital comparator 18 does not supply coincidence output signal $S_I$, as illustrated in FIG. 2G. AND circuit 19 is not open, and hence, sampling pulse $P_{S(AD)}$ from controller 5 is not supplied to counter 20, as shown in FIG. 2H, so that OR circuit 22 does not generate net marker signal $S_M'$, as shown in FIG. 2J. Thus, controller 5 cannot generate a segment switching signal $S_G$ in response to a detected marker signal $S_M$. When a marker signal $S_M$ drops out, the embodiment of the present invention generates a pseudo or dummy segment switching signal $S_G'$, as shown by the broken line in FIG. 2L, in response to a preceding net marker signal $S_M'$ (see FIG. 2J).

Referring now to FIG. 3, it will be seen that the circuit of controller 5 included in the marker signal detecting system of FIG. 1, may comprise a synchronous signal generator 31 which receives start signal $S_T$ and vertical synchronizing signal $V_D$ and generates synchronous signal $S_V$ (see FIG. 2C) which, as described before, has a period of 4V and is synchronized with start signal $S_T$ and vertical synchronizing signal $V_D$. A marker window timer 32 receives synchronous signal $S_V$ and repetitively generates self-running marker window signals $S_{W1}$ to $S_{W6}$ in response thereto until a marker signal is detected to occur during one of the window signals. Each self-running marker window signal $SW_i$ (i equals 1 to 6) has a duration time 2t, as illustrated in FIGS. 4A to 4F. It is to be appreciated that self-running marker signals $S_{Wi}$ do not have to be in six steps, as illustrated in FIGS. 4A to 4F, but rather, can be any desired number of steps.

In the illustrated embodiment, the third self-running window signal $S_{W3}$ is selected as the initial state. The self-running window signals are time-shifted in a repetitive or step-wise fashion beginning with this window signal, i.e., the window signals are repetitively selected in the following sequence:

$$S_{W3} \rightarrow S_{W4} \rightarrow S_{W5} \rightarrow S_{W6} \rightarrow S_{W1} \rightarrow S_{W2} \rightarrow S_{W3}.$$

A signal selector 33 receives self-running window signals $S_{Wi}$ and repetitively supplies one of the signals to AND circuit 16 (FIG. 1) after the occurrence of a net marker signal $S_M'$ during a window signal. Signal selector 33 selects one by one self-running window signal $S_{Wi}$ in response to start signal $S_T$. As described more fully hereinbelow, when net marker signal $S_M'$ is detected, signal selector 33 changes over from an initial mode to a triggered mode for passing therethrough a triggering marker window signal from a triggering marker window timer 34 which is controlled in response to net marker signal $S_M'$.

The end of each of the window signal $S_{Wi}$ supplied from signal selector 33 to AND circuit 16 is detected by a window signal end detector 35. For example, in the initial mode of selector 33, when self-running window signal $S_{W3}$ (see FIG. 5B) is supplied from self-running marker window timer 32 through signal selector 33 as window signal $S_W$, window signal end detector 35 detects the end of self-running window $S_{W3}$. As is clear from a comparison of FIGS. 5A and 5B, in the illustrated example, signal $S_M$ is outside the window of self-running window signal $S_{W3}$ and hence is not detected. Accordingly, window signal end detector 35 generates a dummy segment switching signal $S_G'$ which rises at the end of self-running window signal $S_{W3}$, as shown in FIG. 5C, and which is supplied through OR gate 36 to signal processing circuit 6 (see FIG. 1) and segment pattern generator 37.

The above-described operation is performed several times, for example, four (4) times for the same window signal. Window signal end detector 35 generates dummy segment switching signal $S_G'$ in response to each self-running window signal $S_{W3}$ supplied thereto. A missing or undetected signal counter 38 counts the number of dummy segment switching signals $S_G'$ which window signal end detector 35 generates. When the count in missing signal counter 38 reaches a predetermined value, for example, four (4), counter 38 overflows and supplies an overflow signal to signal selector 33. Signal selector 33 is changed to supply the next sequential self-running window signal $S_{W4}$, as shown in FIG. 5D, in response to the overflow signal from counter 38. It is to be appreciated that signal selector 33 repeatedly supplies self-running window signal $S_{W3}$, that is, the initial signal, until it receives the overflow signal from counter 38.

The above-described operation is also repeated a plurality of times, for example, four (4) times, with self-running window signal $S_{W4}$ until counter 38 overflows or net marker signal $S_M'$ is detected. It is to be understood that a dummy segment switching signal $S_G'$ as shown in FIG. 5E, is produced in response to each window signal $S_{Wi}$ which is supplied to OR gate 36 and is counted by missing signal counter 38.

When at least a part of marker signal $S_M$ (FIG. 5A) coincides with a window signal $S_{Wi}$, for example, a window signal $S_{W5}$, the corresponding net marker signal $S_M'$ changes signal selector 33 to its triggered mode where it supplies triggering marker window signals. In addition, net marker signal $S_M'$ clears counter 38 and inhibits window signal end detector 35 from generating dummy segment switching signal $S_G'$. Net marker signal $S_M'$ is supplied to a delay circuit 39 which delays same by a predetermined amount t after which it is then supplied to triggering marker window timer 34 as a start signal. Triggering marker window timer 34 then generates a triggering marker window signal $S_W$ in response thereto, as shown in FIG. 5F, which is supplied through signal selector 33 to AND gate 16 and window signal end detector 35. As is clear from FIG. 5F, triggering marker window signal $S_W$ supplied to window signal end detector 35 falls in synchronism with, for example, the leading edge of net marker signal $S_M'$ (see FIG. 5G) when net marker signal $S_M'$ is supplied to window signal end detector 35 as a cancel signal. That is, the triggering marker window signal $S_W$ is closed in response to the leading edge of the net marker signal $S_M'$. It is also to be noted that the signal from delay circuit 39 is supplied as a net segment switching signal $S_G$, as shown in FIG. 5H, to OR circuit 36, and thence, to signal processing circuit 6 (see FIG. 1) and segment pattern generator 37.

Referring to FIGS. 5I and 5L, once marker signal $S_M$ is detected, triggering marker window timer 34 generates triggering marker window signals $S_W$ at every (T−t) time. As shown in FIGS. 5J and 5M, net marker signals $S_M'$ close the windows of such triggering marker window signals $S_W$. In other words, the net marker signal substantially controls the window opening time of the triggering marker window signal generated after the marker signal is detected.

Referring to FIG. 5J, the time interval t' represents an amount of displacement corresponding to timebase fluctuations which occur in the transmitting system. As shown in FIGS. 5K and 5N, segment switching signals $S_G$ are supplied to OR circuit 36 in the time t after net marker signals $S_M'$ (shown in FIGS. 5J and 5M) are generated.

Synchronous signal $S_V$ from synchronous signal generator 31 is supplied to a marker window control timer 40 which generates a gate control signal to be supplied to a gate circuit 41. Gate circuit 41 controls the timing of the triggering marker window signal $S_W$ supplied to signal selector 33 as a window signal so that the detected marker signal $S_M$ will exist in the period T of synchronous signal $S_V$ without fail.

The circuit of FIG. 3 is further shown to include a sample pulse generator 42 which generates sample pulses $P_{S\,(AD)}$ and a sample pulse generator 43 which generates sample pulses $P_{S\,(DA)}$.

The above described embodiment of the present invention detects a marker signal which is inserted as a reference signal for switching segments of a scrambled audio system. The present invention, however, is not limited to such an application, but can be applied to other information signals which require the detection of a marker signal. For example, the present invention can be applied to detect a control signal or the like which is periodically inserted into any suitable transmitted information signal.

As described hereinbefore, according to the present invention, a system is provided which generates a window signal to detect a part of an audio signal containing at least a periodically inserted marker signal. The window signal is moved or time-shifted automatically in a step-wise fashion until the occurrence of a marker signal during one of the window signals is detected. When the marker signal is detected one time, the window signal can be set so that the marker signal will continue to occur within the window signal by relying upon the periodicity of the marker signal. As a result, each subsequent marker signal can be accurately detected on the basis of the first detected marker signal. Signal processing, such as, rearranging a scrambled audio signal or the like can be accurately performed with the signals derived from the present invention. Furthermore, even when a marker signal cannot be detected due to an error or drop-out in the transmission path or the like, a dummy signal is generated to compensate for the missing signal by using a preceding marker signal as a reference.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A system for detecting a marker signal with a predetermined pattern in an information signal so as to compensate for timebase errors therein, said market signal being originally inserted periodically in said information signal, said system comprising:
    means for repetitively generating first window signals and successively shifting said first window signals in a step-wise fashion during a predetermined interval;
    detecting means receiving said first window signals as received window signals for detecting at least a portion of a marker signal in said information signal when at least said portion of the detected marker signal occurs during one of said received window signals;
    means responsive to said received window signals for determining when said detected marker signal has said predetermined pattern and generating a net marker signal in response thereto; and
    means responsive to said net marker signal for repetitively generating subsequent unshifted window signals each beginning at a predetermined time after the detection of a respective detected marker signal and for supplying said unshifted window signals to said detecting means as said received window signals in place of said first window signals for as long as said detecting means detects a portion of the detected maker signal during each received window signal.

2. The system of claim 1; and further comprising means for generating a dummy signal in response to a failure to detect at least a portion of a marker signal during one of said received window signals after a first said marker signal has been detected.

3. The system of claim 2, wherein said means for generating said dummy signal generates said dummy signal in response to the end of each of said window signal.

4. The system of claim 1; wherein said means for repetitively generating first window signals includes:
    marker window timer means for generating a plurality of repeating window signals in said step-wise fashion so that each of said repeating window signals is delayed a predetermined amount from the next preceding repeating window signal;

window signal end detector means for generating a dummy signal in response to the end of a selected one of said repeating window signals;

means for counting said dummy signal and producing an overflow signal when the count thereof exceeds a preset value; and selecting means for supplying said selected one of said repeating window signals as said first window signal in response to said overflow signal.

5. The system of claim 4; wherein said means for determining includes:

pulse generating means for generating pulse signals at a rate corresponding to said predetermined pattern;

shift means responsive to said pulse signals and to said received window signals for shifting said marker signal to produce a pattern signal;

comparator means for comparing said pattern signal with a signal having said predetermined pattern to produce a coincidence signal when said compared signals correspond; and means for generating said net marker signal in response to said pulse signals and said coincidence signal.

6. The system of claim 5; wherein said means for generating said marker signal includes:

first gate means for supplying an output signal in response to both said pulse signal and said coincidence signal;

counter means for counting said output signal from said gate means to produce count signals in response thereto; and second gate means for supplying said net marker signal in response to said count signal from said counter means.

7. The system of claim 6; wherein said second gate means supplies said net marker signal when the count of said counter means exceeds a preset value.

8. The system of claim 6; wherein said detecting means includes:

high pass filter means for filtering said information signal to produce a filtered information signal;

waveform shaping means for shaping said filtered information signal to produce said marker signal as a digital signal; and selector means for supplying said marker signal from said waveform shaping means to said shift means in response to said received window signals.

9. The system of claim 4; and further comprising: delay means for delaying said net marker signal by a preset amount to produce a delayed net marker signal; and means for supplying one of said delayed net marker signal and said dummy signal as an identifying signal.

10. The system of claim 9; wherein said means for repetitively generating subsequent unshifted window signals includes:

trigger marker window timing means for generating a triggering marker window signal in response to said delayed net marker signal;

marker window control timing means for generating gating signals in response to an external synchronous signal; and gate means for supplying said triggering marker window signal to said selecting means in response to said gating signals.

11. The system of claim 10; wherein said information signal is a scrambled audio signal.

12. The system of claim 11; and further comprising means for generating a descrambling signal in response to said identifying signal.

13. The system of claim 12; and further comprising signal processing means for descrambling said scrambled audio signal in response to said descrambling signal.

* * * * *